United States Patent [19]

Lobb et al.

[11] Patent Number: 4,790,364

[45] Date of Patent: Dec. 13, 1988

[54] SIDEWALL AND BEAD REINFORCING STRUCTURE FOR A PNEUMATIC AIRCRAFT TIRE

[75] Inventors: Jolan F. Lobb, North Canton; Clarence B. Alsobrook, Akron, both of Ohio; Robert G. Armbruster, Strassen, Luxembourg

[73] Assignee: The Goodyear Tire & Rubber Company, Akron, Ohio

[21] Appl. No.: 77,823

[22] Filed: Jul. 27, 1987

[51] Int. Cl.[4] .................. B60C 3/00; B60C 15/06
[52] U.S. Cl. .................. 152/454; 152/546; 152/554; 152/555
[58] Field of Search ............ 152/454, 539, 541, 542, 152/543, 546, 548, 549, 552, 554, 555, 564

[56] References Cited

U.S. PATENT DOCUMENTS

| | | | |
|---|---|---|---|
| 1,263,400 | 4/1918 | Frank | 425/58 |
| 1,470,657 | 10/1923 | Traum | 425/51 |
| 1,642,541 | 9/1927 | Ellinwood | 264/315 |
| 2,873,479 | 2/1959 | Pietro | 425/43 |
| 3,052,275 | 9/1962 | Hylbert, Jr. | 152/541 |
| 3,645,655 | 2/1972 | Beneze | 425/582 |
| 3,709,276 | 1/1973 | Montague | 152/554 |
| 3,910,336 | 10/1975 | Boileau | 152/454 X |
| 3,951,192 | 4/1976 | Gardner et al. | 152/379.3 |
| 4,023,608 | 5/1977 | Meiss | 152/541 |
| 4,076,066 | 2/1978 | Verdier | 152/454 |
| 4,120,338 | 10/1978 | Mirtain | 152/541 |
| 4,177,851 | 12/1979 | Gill et al. | 152/152 |
| 4,215,737 | 8/1980 | Motomura et al. | 152/542 X |
| 4,238,259 | 12/1980 | Gill et al. | 156/131 |
| 4,261,405 | 4/1981 | Yamauchi et al. | 152/454 |
| 4,326,576 | 4/1982 | Mizumoto et al. | 152/541 |
| 4,365,659 | 12/1982 | Yoshida et al. | 152/510 |
| 4,427,046 | 1/1984 | Balbis et al. | 152/209 R |
| 4,445,560 | 5/1984 | Musy | 152/454 X |
| 4,471,828 | 9/1984 | Kishida et al. | 152/541 |
| 4,541,467 | 9/1985 | Nakamura et al. | 152/548 |
| 4,609,023 | 9/1986 | Loser | 152/454 |
| 4,700,764 | 10/1987 | Endo et al. | 152/543 X |
| 4,726,408 | 2/1988 | Alie et al. | 152/541 |

FOREIGN PATENT DOCUMENTS 0182026 6/1985 European Pat. Off. .
3522332 11/1987 Fed. Rep. of Germany .
85/8254 4/1985 South Africa .

Primary Examiner—Michael W. Ball
Assistant Examiner—Geoffrey L. Knable
Attorney, Agent, or Firm—L. R. Drayer

[57] ABSTRACT

A tire structure that is especially advantageous for an aircraft tire has a pair of annular elastomeric members (40,41) disposed axially inwardly of the carcass plies (13,14) to maintain the carcass plies in a desired configuration. A preferred arrangement of bead reinforcing strips (32,33,34,35) is disclosed for use in tires that are intended for mounting on H-type aircraft rims.

4 Claims, 2 Drawing Sheets

SIDEWALL AND BEAD REINFORCING STRUCTURE FOR A PNEUMATIC AIRCRAFT TIRE

BACKGROUND OF INVENTION

The present invention relates generally to pneumatic tires, and more specifically to pneumatic tires having an elastomeric forming member located axially inwardly of the carcass plies in the radially innermost portion of each sidewall.

It is recognized in the tire art that it is desirable in a radial ply tire to have the carcass ply, or plies, follow a path between the bead cores such that there is no reversal of curvature in said path anywhere other than very close to the bead cores. During the vulcanization process, the tire is disposed between the inner surfaces of a mold and the outer surface of an elastomeric bladder which is under pressure. The elastomeric bladder may be pressurized by steam, hot water, or any other suitable pressure exerting medium. The internal contours of the mold and the external contours of the bladder will affect the shape of the tire and, more specifically, the path followed by the cords of the carcass ply of the tire. It has been noted that the bladders available for use in the manufacture of particular sizes of tires are not conducive to the production of tires that are free of an undesirable reversal of curvature in the path followed by the carcass plies.

SUMMARY OF THE INVENTION

A tire manufactured in accordance with the invention disclosed herein has an annular elastomeric forming member with a crescent shaped radial cross section disposed axially inwardly of the carcass plies to cause the carcass plies to follow a path which does not have the undesirable reversal of curvature. The structure of the resulting tire has yielded improved results in the durability of the tire of an unexpected magnitude.

There is provided in accordance with one aspect of the invention a pneumatic tire comprising at least one turn-up carcass ply of reinforcing elements oriented at 75° to 90° with respect to a mid-circumferential plane of the tire folded about a pair of annular beads. An elastomeric apex strip is disposed radially outwardly of each bead and is interposed between a main portion and a respective edge portion of the radially outermost turn-up carcass ply. Disposed axially inwardly of the axially innermost turn-up carcass ply is an annular elastomeric means for stiffening the radially innermost portion of a sidewall of the tire and maintaining said turn-up carcass plies in a preferred location during vulcanization of the tire, such that said turn-up carcass ply or plies follow a path along the radial extent of said annular elastomeric means which has a center of curvature disposed only axially inwardly of the axially innermost turn-up carcass ply. Said means having a radially innermost edge which is located radially inwardly of a radially outermost edge of the associated apex strip.

There is provided in accordance with another aspect of the invention a pneumatic tire comprising a pair of axially spaced apart annular beads, at least one turn-up carcass ply of reinforcing elements oriented at 75° to 90° with respect to a mid-circumferential plane of the tire, each said turn-up carcass ply having a main portion and a pair of axially spaced apart edge portions, each of said edge portions being folded axially and radially outwardly about one of said beads, an elastomeric apex strip is disposed radially outwardly of each bead core and interposed between the main portion and respective edge portion of the radially outermost turn-up carcass ply, a pair of sidewall portions each of which comprises an axially outermost sidewall layer of elastomeric material is disposed axially outwardly of said carcass plies and extends radially outwardly from the associated bead, and a pair of annular elastomeric members, with one of said annular elastomeric members being associated with each of said sidewalls and disposed axially inwardly of said carcass ply or plies, each of said annular elastomeric members having a radially innermost edge which is disposed radially inwardly of a radially outermost edge of the associated apex strip, a radially outermost edge of each said annular elastomeric member is disposed radially inwardly of the axially widest part of the tire, said turn-up carcass ply or plies following a path along the radial extent of each said annular elastomeric member such that said path has a center of curvature disposed only axially inwardly of the main portion of the axially innermost carcass ply.

There is provided in accordance with another aspect of the invention a pneumatic tire suitable for use on an aircraft comprising: a pair of bead portions containing axially spaced part annular beads; at least two turn-up carcass plies of aramid cables oriented at 75° to 90° with respect to a mid-circumferential plane of the tire, each said turn-up carcass ply having a main portion and a pair of axially spaced apart edge portions, each of said edge portions being folded axially and radially outwardly about one of said beads: and an elastomeric apex strip disposed radially outwardly of each bead and interposed between the main portion and respective edge portion of the radially outermost turn-up carcass ply: a pair of sidewall portions, each of which comprises an axially outermost sidewall layer of elastomeric material disposed axially outwardly of said carcass plies; and a pair of annular elastomeric forming members each of which has a substantially cresent shaped radial cross-section, one of said forming members being associated with each of said sidewalls and annular beads and being disposed axially inwardly of said carcass plies, each said forming member having a radially innermost edge which is disposed axially inwardly of a plane which is perpendicular to the axis of rotation of the tire and is located midway between the axially innermost and outermost extents of the associated annular bead, a radially outermost edge of each forming member being disposed radially outwardly of the edge portions of each said turn-up carcass ply but radially inwardly of the axially widest part of the tire, said carcass plies following a path along the radial extent of each forming member such that said path has a center of curvature disposed only axially inwardly of said carcass plies.

To acquaint persons skilled in the art with the principles of the invention, certain presently preferred embodiments illustrative of the best mode now contemplated for the practice of the invention are described herein making reference to the attached drawings forming a part of the specifications and in which drawings:

DETAILED DESCRIPTION OF THE PREFERRED EMBODIMENT

Figure 1:
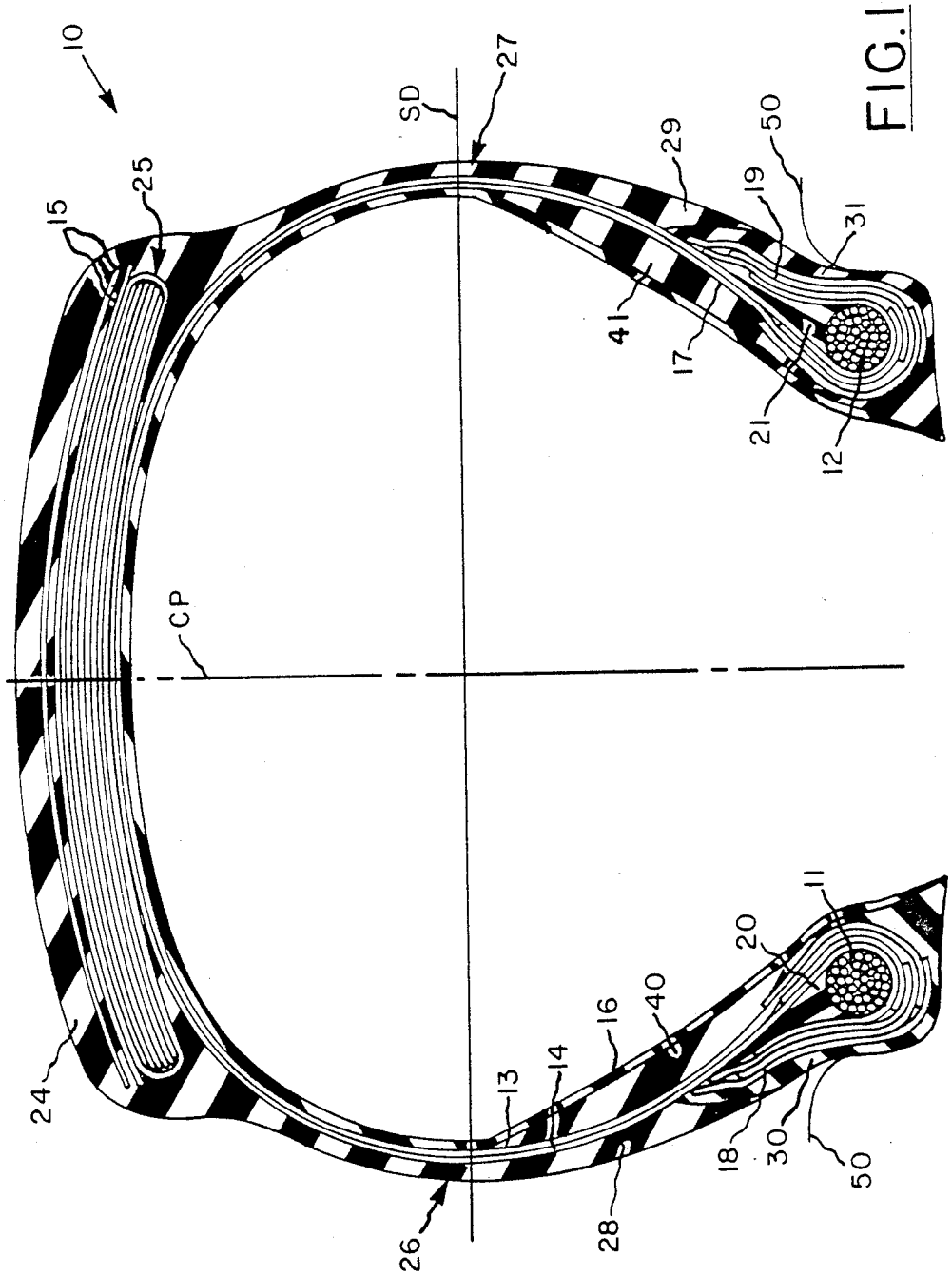
FIG. 1 is a radial cross-sectional view of a tire manufactured according to the present invention.

The tire 10 illustrated in FIG. 1 is a tire of size H44.5X16.5R20 suitable for use on an aircraft. As used herein and in the claims, a tire is "suitable for use on an aircraft" if the tire is of a size and load range, or ply rating, specified in either the *YEARBOOK OF THE TIRE AND RIM ASSOCIATION*, or in the *YEARBOOK OF THE EUROPEAN TYRE AND RIM TECHNICAL ORGANIZATION*, for the year in which the tire is manufactured.

The letter H in the size designation of an aircraft tire is used in the tire industry to indicate that a tire is to be mounted upon an H-type rim, and of course, the letter H in the rim description means that it is an H-type rim. As used herein and in the claims, an "H-type rim" is understood to mean a rim that meets the criteria for an H-type rim as set forth on pages AC-30-B (dated 10/31/85 and revised 07/22/86 and AC-31-C (dated 10/31/85) of *AIRCRAFT ENGINEERING DESIGN INFORMATION* published by The Tire and Rim Association, Incorporated, 3200 West Market Street, Akron, Ohio 44313 U.S.A., which is incorporated herein by reference for the purpose of defining an H-type rim. As a matter of practicality, it should be pointed out that all, or nearly all, H-type rims will have their size permanently indicated thereon with the letter H included in the size designation.

It is generally recognized in the tire art that tires suitable for use on aircraft must be capable of operating under conditions of very high speeds and large loads as compared to tires used on automobiles, busses, trucks or similar earthbound vehicles. It is understood, however, that tires for such earthbound vehicles may advantageously be made in accordance with the invention described herein.

A tire 10 according to the invention has a pair of axially spaced apart annular beads 11,12. Two or more carcass plies 13,14 of reinforcing elements which are oriented at 75° to 90° with respect to a mid-circumferential plane CP of the tire extend between the annular beads 11,12. As used herein, and in the claims, "carcass ply" is understood to mean both the reinforcing elements and the elastomeric substance in which the elements are embedded during the tire manufacturing process. Tires have also been manufactured according to the invention having three and four carcass plies. In the tire illustrated in FIG. 1, the reinforcing elements comprise aramid cables. As used herein and in the appended claims "aramid" is understood to mean a manufactured fiber in which the fiber forming substance is generally recognized as a long chain synthetic aromatic polyamide in which at least 85% of the amide linkages are attached directly to two aromatic rings. Representative of an aramid is a poly(p-phenyleneterephthalamide). Each of the carcass plies 13,14 is a turn-up carcass ply which has a main portion 17 and a pair of axially spaced apart edge portions 18,19, each of said edge portions being folded axially and radially outwardly about one of the annular beads 11,12. It is understood that tires according to the invention may also have one or more turn-down carcass plies that are folded axially and radially inwardly about the annular beads and the turn-up carcass plies. As used herein and in the claims, the terms "axial" and "axially" refer to directions which are parallel to the axis of rotation of the tire, and the terms "radial" and "radially" refer to directions that are perpendicular to the axis of rotation of the tire.

An elastomeric apex strip 20,21 is disposed radially outwardly of each of the annular beads 11,12 and is interposed between the main portion 17 and a respective edge portion 18,19 of the radially outermost turn-up carcass ply 14. A ground engaging tread portion 24 comprising a suitable elastomeric compound is disposed radially outwardly of the carcass ply, or plies, in a crown region of the tire. A belt structure 25 is interposed between the carcass or plies 13,14, and the tread portion 24. If desired, one or more wraps 15 of a suitable material may be disposed radially outwardly of the belt structure 25 to function as a restricting member and counteract the centrifugal forces acting on the belt structure. The belt structure 25 shown in FIG. 1 comprises a combination of folded and unfolded belts, but the use of a particular belt structure is not believed to be critical to the practice of the present invention. Preferably, a layer of a substantially air impervious material 16, commonly referred to as an innerliner, is disposed on the inside of the tire.

A pair of sidewall portions 26,27, each of which has an axially outermost sidewall layer 28,29 of a suitable elastomeric material is disposed axially outwardly of the carcass plies 13,14 and extends radially outwardly from the associated bead to the tread portion 24. A chafer strip 30,31 is situated axially outwardly and radially inwardly of the carcass plies such that the radially inner and axially outer surfaces of each bead region of the tire comprise one of said chafer strips. The chafer strips comprise an elastomeric substance selected in accordance with good engineering practice for having a high resistance to abrasive wear when the bead portions of the tire are in contact with a rim.

Figure 2:
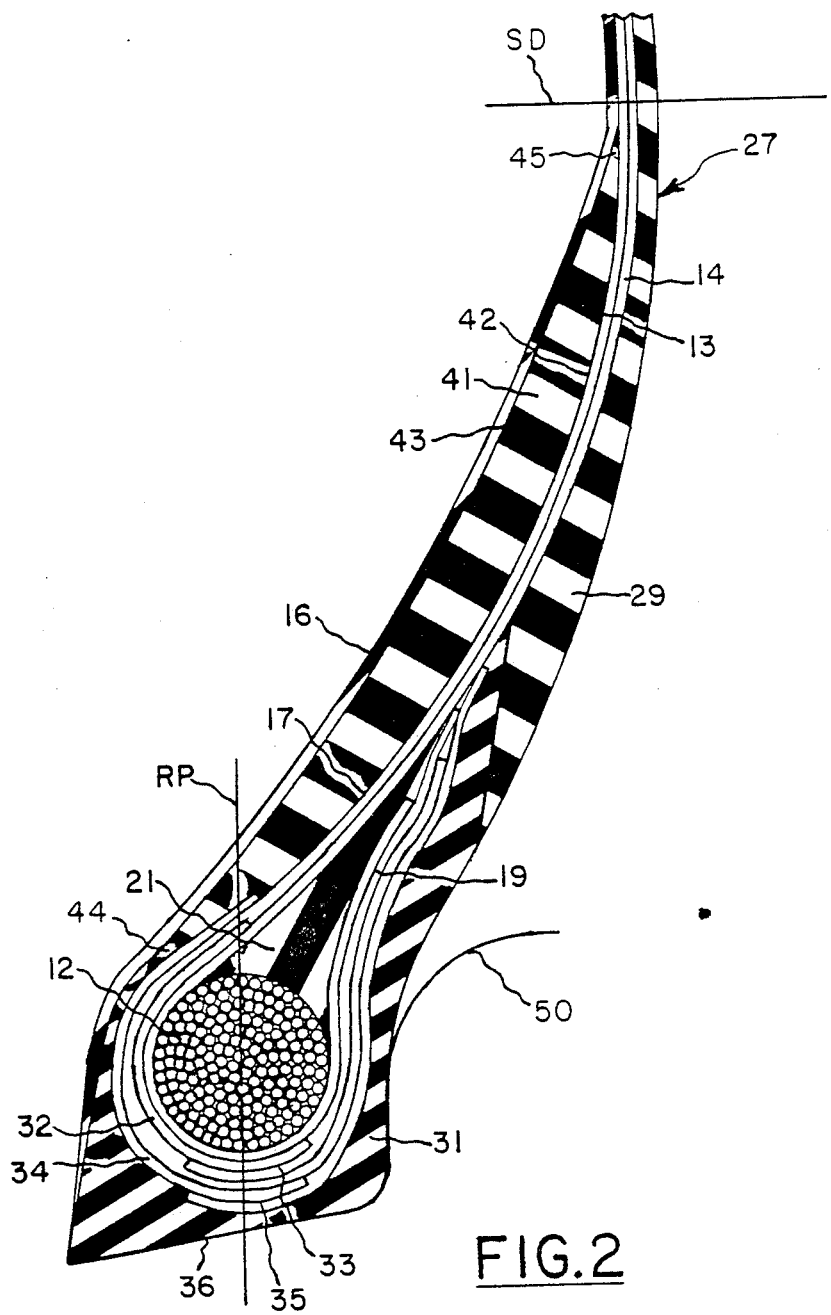
FIG. 2 is an enlarged fragmentary view of the radially innermost portion of a sidewall and the associated bead portion of the tire illustrated in FIG. 1.

At least one reinforcing strip of nylon cords 32,33,34,35 is folded about each annular bead on a side of the carcass ply, or plies, which is distal from the annular bead. In the embodiment illustrated in FIGS. 1 and 2, which embodiment is for an H-type tire, a number of reinforcing strips 32,33,34,35 are disposed in pairs that are folded around a bead core 12 as best shown in FIG. 2. The reinforcing strips of each pair 32,33 and 34,35 are in overlapping relationship with one another with the area of overlap being located only between the bead core 12 and the base 36 of the bead. The advantage of this arrangement of the reinforcing strips in an H-type tire is that there is a greater amount of elastomer between the rim flange 50 and the fabric members of the tire than would result if the reinforcing strips were single continuous pieces as in most other tires. The axial width of the overlap in a pair of reinforcing strips should be at least about 1.25 cm so that compression between the bead core and the tire mold will hold the reinforcing strips in place during the vulcanization process. The nylon cords in the reinforcing strips may be oriented at about 45° to 60° with a radial plane, and in the strips of each pair may be either grouped in one direction or cross one another. It is not believed to be necessary to use this type of arrangement of the reinforcing strips in tires that are not designed for use with H-type rims.

An annular elastomeric forming member 40,41 is associated with each of the sidewalls 26,27 and is disposed axially inwardly of all of the carcass plies 13,14. Preferably each of the forming members 40,41 has a substantially crescent shaped radial cross-section, and most preferably a cross-section that is exactly crescent shaped. As used herein, a "crescent" shape is understood to refer to a shape having only two edges which is defined by a convex edge 42 and a concave edge 43, the center of curvature of both of said edges being located axially inwardly of the forming member. However, it is commonly recognized in the tire art that elastomeric compounds may flow during vulcanization and a forming member is understood to have a "substantially crescent shaped" cross-section even if the edges have some waviness or undulations therein. The "forming members" 40,41 are an annular elastomeric means for stiffening the radially innermost portion of a sidewall 26,27 of a tire and maintaining the turn-up carcass plies 13,14 in a preferred location during vulcanization of the tire such that the turn-up carcass plies follow a path along the radial extent of said annular elastomeric means which has a center of curvature disposed only axially inwardly of the axially innermost turn-up carcass ply 13. Each of the elastomeric forming members has a radially innermost edge 44 which is disposed radially inwardly of a radially outermost edge of the associated apex strip 20,21. A radially outermost edge 45 of each forming member is disposed radially inwardly of the axially widest part of the tire SD. Preferably, each of the elastomeric members 40,41 has a radially innermost edge 44 which is disposed axially inwardly of a plane RP which is perpendicular to the axis of rotation of the tire and is located midway between the axially innermost and outermost extents of the associated annular bead 12. Preferably, the radially outermost edge 45 of each forming member 40,41 is disposed radially outwardly of the edge portions 18,19 of all of the turn-up carcass plies 13,14. As a result of the presence of the forming members, the turn-up carcass ply, or plies, follow a path in radial cross-section along the radial extent of each forming member such that said path has a center of curvature disposed only axially inwardly of the main portion 17 of the axially innermost carcass ply 13. Put another way, in a preferred embodiment of the invention, there is no reversal of the curvature of the path of the reinforcing elements in the turn-up carcass plies at any location which would be radially outwardly of a flange 50 of a rim that the tire is designed to be mounted upon, as specified in either the *YEARBOOK OF THE TIRE AND RIM ASSOCIATION*, or the *YEARBOOK OF THE EUROPEAN TYRE AND RIM TECHNICAL ORGANIZATION*, published in the year that the tire is manufactured.

Tires according to the invention have been satisfactorily manufactured have the forming members 40,41 comprising the same elastomeric compound as is used for either the apex strips 20,21 or the chafer strips 30,31. However, the exact elastomeric compound used in the forming members is not believed to be critical to the practice of the invention so long as it adheres to adjacent compounds and is stiff enough to perform the function of maintaining the turn-up carcass plies 13,14 in the desire configuration during the vulcanization process.

Tests have been conducted in order to compare aircraft tires of size H44.5X16.5 R 20 manufactured with forming members with similar tires that did not contain forming members, but which were vulcanized using substantially the same bladders and molds. The results of the tests are set forth in Table I and Table II. The tires were tested in a laboratory using a dynamometer with the objective in each instance being 61 test cycles. The test cycles were programmed as follows:

(a) 50 cycles that simulated the take-off of an aircraft;

(b) 8 cycles that simulated an aircraft taxiing at the same load as in the first 50 take-off cycles;

(c) 2 cycles that simulated an aircraft taxiing at 120% of the load used for the preceding eight cycles:

(d) 1 cycle that simulated an aircraft taking off at 150% of the load used in the other 50 take-off cycles.

The tests reported in Table I were conducted with one load during the first 50 cycles, and the tests reported in Table II were conducted with a load during the first 50 cycles that was about 150% of that used for the first 50 cycles of the tests reported in Table I.

TABLE I

| Tire No. | No. of Carcass Plies | Contained Forming Members | Test Cycles Completed |
| --- | --- | --- | --- |
| 1 | 2 | No | 54 |
| 2 | 2 | Yes | 61 |
| 3 | 3 | No | 54 |
| 4 | 3 | No | 51 |
| 5 | 3 | No | 58 |
| 6 | 3 | No | 53 |
| 7 | 3 | No | 33 |
| 8 | 3 | Yes | 61 |
| 9 | 3 | Yes | 61 |

TABLE II

| Tire No. | No. of Carcass Plies | Contained Forming Members | Test Cycles Completed |
| --- | --- | --- | --- |
| 1 | 2 | No | 17 |
| 2 | 2 | Yes | 35 |
| 3 | 3 | No | 6 |
| 4 | 3 | No | 19 |
| 5 | 3 | No | 14 |
| 6 | 3 | Yes | 27 |
| 7 | 3 | Yes | 51 |
| 8 | 3 | Yes | 50 |
| 9 | 3 | Yes | 54 |
| 10 | 4 | No | 18 |
| 11 | 4 | Yes | 53 |

The test results set forth in Table I and Table II clearly show improved durability performance in the tires containing forming members as compared to similar tires that did not contain forming members.

While certain representative embodiments and details have been shown for the purpose of illustrating the invention, it will be apparent to those skilled in the art that various changes and modifications may be made therein without departing from the spirit or scope of the invention.

We claim:

1. A pneumatic tire comprising:
    a pair of annular beads;
    two turn-up carcass plies of reinforcing elements oriented at 75 to 90 degrees with respect to the mid-circumferential plane of the tire, the turn-up carcass plies having main portions and pairs of axially spaced apart edge portions, each of said edge portions being folded axially and radially outwardly around one of the annular beads; and
    first and second pairs of reinforcing strips, folded around one of the annular beads, said first pair of reinforcing strips being disposed between the two turn-up carcass plies and said second pair of reinforcing strips being folded around both turn-up carcass plies each reinforcing strip of the first and second pairs being contiguous and overlapping with the other reinforcing strip of the same pair only in an area between the annular bead and the base of the bead portion.

2. A pneumatic tire as in claim 1 wherein:
each pair of reinforcing strips is associated with and contiguous to its respective carcass ply, such carcass ply being disposed between the pair of reinforcing strips and the bead, and
the reinforcing strip contiguous to the edge portion of its respective carcass ply extends radially a greater distance from the tire's axis of rotation than does the edge portion.

3. A pneumatic tire as in claim 1 wherein each of the non-overlapping ends of the second pair of reinforcing strips extends a greater radial distance from the tire's axis of rotation than the corresponding ends of the first pair of reinforcing strips.

4. A pneumatic tire suitable for use on an H-type rim for use on an aircraft comprising:
  (a) a pair of bead portions containing axially spaced apart annular beads;
  (b) first and second pairs of reinforcing strips folded around one of the annular beads, each reinforcing strip of the first and second pairs being contiguous and overlapping with the other reinforcing strip of the same pair only in an area between the annular bead and the base of the bead portion;
  (c) at least two-turn-up carcass plies of aramid cables oriented at 75° to 90° with respect to a mid-circumferential plane of the tire, each said turn-up carcass ply having a main portion and a pair of axially spaced apart edge portions, each of said edge portions being folded axially and radially outwardly about one of said beads said first pair of reinforcing strips being disposed between the turn-up carcass plies and said second pair of reinforcing strips being folded around the at least two turn-up carcass plies;
  (d) an elastomeric apex strip disposed radially outwardly of each bead and interposed between the main portion and respective edge portion of the radially outermost turn-up carcass ply;
  (e) a pair of sidewall portions each of which comprises an axially outermost sidewall layer of elastomeric material disposed axially outwardly of said carcass plies; and
  (f) a pair of annular elastomeric forming members each of which has a substantially crescent shaped radial cross-section, one of said forming members being associated with each of said sidewalls and annular beads and being disposed axially inwardly of said carcass plies, each said forming member having a radially innermost edge which is disposed axially inwardly of a plane which is perpendicular to the axis of rotation of the tire and is located midway between the axially innermost and outer most extents of the associated annular bead, a radially outermost edge of each forming member being disposed radially outwardly of the edge portions of each said carcass ply but radially inwardly of the axially widest part of the tire, said carcass plies following a path along the radial extent of each forming member such that said path has a center of curvature disposed only axially inwardly of said main portion of said carcass plies.

* * * * *